United States Patent [19]
Stubbs et al.

[11] Patent Number: 5,622,741
[45] Date of Patent: Apr. 22, 1997

[54] PROCESS FOR PREPARING A POTATO PRODUCT HAVING AN EXTENDED HOLD TIME

[75] Inventors: Clifford A. Stubbs, Iona; John F. Stevens, Idaho Falls, both of Id.

[73] Assignee: Miles J. Willard, Idaho Falls, Id.

[21] Appl. No.: 656,931

[22] Filed: Jun. 3, 1996

[51] Int. Cl.⁶ .................................................. A23L 1/217
[52] U.S. Cl. .......................... 426/243; 426/102; 426/302; 426/438; 426/441; 426/637
[58] Field of Search ................................ 426/102, 637, 426/243, 302, 438, 441

[56] References Cited

U.S. PATENT DOCUMENTS

| | | | |
|---|---|---|---|
| 3,597,227 | 8/1971 | Murray et al. | |
| 4,317,842 | 3/1982 | El-Hag et al. | 426/302 |
| 4,946,694 | 8/1990 | Gunnerson et al. | 426/273 |
| 5,059,435 | 10/1991 | Sloan et al. | 426/102 |
| 5,126,152 | 6/1992 | Feeney et al. | 426/102 |
| 5,141,759 | 8/1992 | Sloan et al. | 426/102 |
| 5,217,736 | 6/1993 | Feeney et al. | 426/102 |
| 5,242,699 | 9/1993 | Bednar et al. | 426/302 |
| 5,279,840 | 1/1994 | Baisier et al. | 426/102 |
| 5,328,704 | 7/1994 | Ritch | 426/102 |
| 5,492,707 | 2/1996 | Chalupa et al. | 426/302 |

FOREIGN PATENT DOCUMENTS

95/05090  2/1995  WIPO ................................ 426/438

Primary Examiner—Arthur L. Corbin
Attorney, Agent, or Firm—Hopkins, Roden, Crockett, Hansen & Hoopes

[57] ABSTRACT

An extended hold potato product comprising cut potatoes having a starch-based coating, the coating including corn starch, corn flour, and low solubility dextrin. In a preferred embodiment, the starch-based coating further includes rice flour, sodium chloride, and sodium acid pyrophosphate. After finish preparation, the potato product retains a generally crisp outer surface texture for an extended period of time. A process for preparing a potato product having an extended hold time comprises (a) washing, cutting, and blanching raw potatoes, (b) partially drying surfaces of the potatoes, (c) applying an aqueous starch-based slurry to the potatoes, the aqueous slurry including corn flour, corn starch, low solubility dextrin, and water, and then (d) parfrying and freezing the coated potatoes.

10 Claims, 1 Drawing Sheet

PROCESS FOR PREPARING A POTATO PRODUCT HAVING AN EXTENDED HOLD TIME

TECHNICAL FIELD

This invention relates to food products and, more particularly, to a potato product with an improved texture which will retain crispness for an extended period.

BACKGROUND OF THE INVENTION

Methods for preparing and applying coatings to the outer surfaces of frozen potato products are known in the art. Coatings have been applied to potato products to achieve various goals. These goals include 1) reducing the amount of oil absorbed during frying, which results in a lower fat product, 2) improving the appearance of the product, 3) improving the texture of the product, and 4) extending the holding time of the product. Extending the holding time of the product results in a product which remains crisp for an extended amount of time after it has been prepared for consumption.

Prior attempts to extend the holding time of a potato product have included coating the potato product before parfrying with costly modified starches, wheat based flours or starches, or gums, alginates, and the like. The wheat based flours or starches contain gluten which makes the potato product unacceptable to gluten-sensitive consumers.

Accordingly, objects of the present invention are to provide a gluten free, low cost potato product with an extended hold time and an improved texture.

SUMMARY OF THE INVENTION

According to principles of the present invention, an extended hold potato product comprises cut potatoes having a starch-based coating, the coating including corn flour, corn starch, and low solubility dextrin. After finish preparation, the potato product retains a generally crisp outer surface texture for an extended period of time. In a preferred embodiment, the starch coating further includes rice flour and sodium chloride.

According to further principles of the present invention, a process for preparing a potato product having an extended hold time comprises (a) washing, cutting, and blanching raw potatoes, (b) partially drying surfaces of the potatoes, (c) applying an aqueous starch-based slurry to the potatoes, the aqueous slurry including corn flour, corn starch, low solubility dextrin, and water, and then (d) parfrying the coated potatoes. After finish preparation, the potato product retains a generally crisp outer surface texture for an extended period of time.

Other objects, advantages, and capabilities of the present invention will become more apparent as the description proceeds.

DETAILED DESCRIPTION OF THE INVENTION

Figure 1:
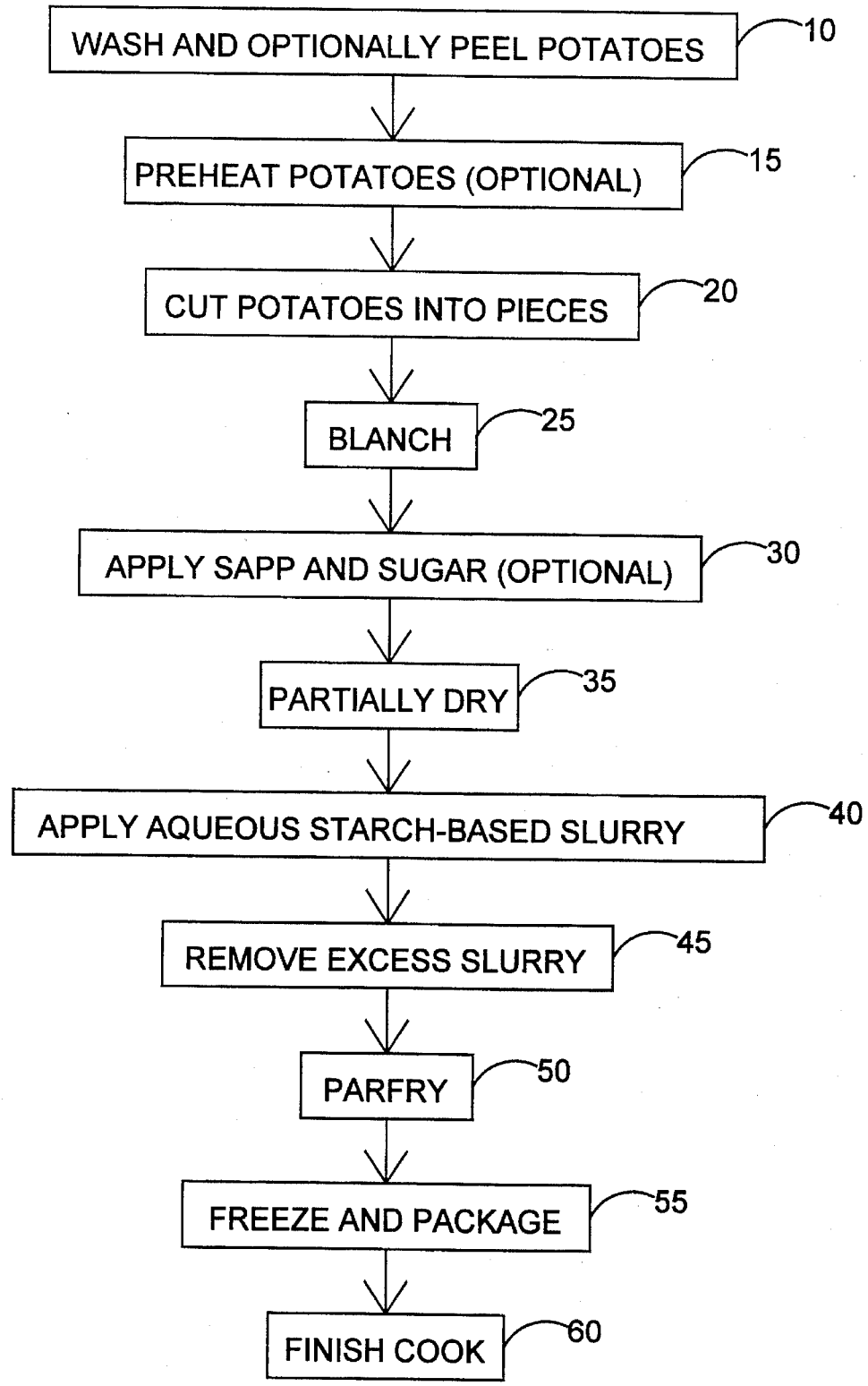
FIG. 1 is a flow diagram describing a preferred method for producing extended hold, improved texture potato products of the present invention.

Referring to FIG. 1, the present invention processes for preparing extended hold, improved texture potato products are shown. Potatoes are first washed and optionally peeled 10. If a finished product with peel remaining intact is desired, the peeling is omitted. The whole potatoes are then optionally preheated 15 for about 20 to 40 minutes to an internal temperature range of 130° to 150° Fahrenheit (54° to 66° Celsius), preferably for 27 minutes to 140° Fahrenheit (60° Celsius). The potatoes are then cut 20 into appropriately sized and shaped pieces, for example, 9/32 inch french fry strips. The preheating step 15 is preferred in the case of a machine-cutting operation in order to reduce product shattering during cutting and to give a smoother cut surface.

After cutting 20, the strips are blanched 25 in steam or hot water at temperatures between 145° F. to 212° F. (63° C.–100° C.) for about 5 to 30 minutes to inactivate enzymes. Optionally, the blanched potato may then be immersed 30 in a dilute aqueous solution containing a food-grade sequestering agent, such as sodium acid pyrophosphate (SAPP) to minimize product discoloration. The aqueous solution may also contain 0.1% to 5% reducing sugar such as dextrose to facilitate uniform color development during frying. The SAPP and reducing sugar solution is typically applied to the potato products in a flume or tube, after which the solution is collected at the end of the flume and recycled back to the start of the flume.

Following blanching and/or application of the aqueous solution, a drying step 35 in hot air at 130° F. to 350° F. (54° C.–177° C.) for 5 to 30 minutes is used to remove surface moisture.

Next, an aqueous starch-based slurry containing about 40% to 80% water, with a preferred water content of about 50% to 60%, is applied 40 to the blanched and dried strips. The slurry is made up of corn flour, corn starch, and low solubility dextrin, and may also contain sodium chloride, rice flour, a modified starch, sodium acid pyrophosphate, and sodium bicarbonate.

For optimal results, the corn flour fraction of the dry ingredients is between about 40 to 60 percent, the low solubility dextrin between about 10 to 30 percent, and the corn starch between about 5 to 20 percent of the weight of the dry ingredients. Preferably the corn flour is about 46 percent, the low solubility dextrin is about 16 percent, and the corn starch is about 12 percent of the weight of the aqueous slurry. The dry ingredients are suspended in water or an aqueous slurry of between 40% to 50% dry ingredients.

As noted, the aqueous slurry may also contain other ingredients, such as sodium chloride, rice flour, sodium acid pyrophosphate (SAPP), and sodium bicarbonate, depending on the end result desired. For example, sodium chloride may be added to the aqueous slurry within a range of about 5 to 10 percent by weight on a dry basis, preferably at least about 7 percent, to produce a more crisp outer texture and to enhance flavor. Rice flour may be added to enhance initial crispness and enable the potato product to retain its structure and shape when held under a heat lamp, thus preventing a shriveled appearance. SAPP may be added to minimize product discoloration. Similarly, various spices or other flavoring ingredients may be added to the aqueous slurry for flavoring as desired. A modified starch was added to the aqueous slurry tested in a discontinuous system, to aid in suspension of the dry ingredients. However, it is not required in a continuous system.

The aqueous slurry is applied by conventional means in the art so that all potato pieces are evenly coated. Removal 45 of the excess slurry coating on the strips is facilitated by briefly using an air knife.

The coated strips are next parfried 50 in oil at a temperature of about 340° F. to 390° F. (177° C.–199° C.) with a preferred temperature of about 370° F. to 380° F. (188° C.–193° C.) and a parfry time of about 30 seconds to 120 seconds, preferably between 40 seconds to 50 seconds.

Finally, the parfried strips are frozen and packaged 55 by conventional means for storage until consumed.

The frozen strips are prepared 60 for consumption by either finish frying, microwaving, or baking. After such preparation the coated strips have a crisp outer layer, a moist and tender interior, and increased holding time when compared to non-coated strips or strips coated by other methods.

The preferred embodiment describes a process for preparing extended hold, improved texture french fries. However, this described process is equally applicable to the preparation of a variety of potato products including, but not limited to, potato strips (french fries), wedges, spirals, slices, lattice-cut slices, and cubes.

EXAMPLES

To further illustrate the present invention, several test examples follow. These examples illustrate, but do not limit, the present invention. Unless otherwise indicated, all parts and percentages are by weight.

Example I

To demonstrate the enhanced crispness and extended hold time provided by the aqueous starch-based slurry of this invention, french fry strips, flat slices and lattice-cut slices were prepared with and without the slurry coating.

Approximately 30 lbs. of 100-count No. 1 Russet potatoes were obtained from a commercial fresh operation. Potatoes were peeled using a Hobart abrasive peeler and then were held in water at 140° F. (60° C.) prior to processing until an internal potato temperature of 135° F. (57° C.) was achieved. Time required to reach the 135° F. (57° C.) internal temperature was 35 minutes. Increasing the potato temperature enables the potato to be cut with minimal surface damage and is standard in the industry.

Samples A1 and A2 were made using ¼" french fry strips. Potatoes were cut into cold water (approximately 60° F., 16° C.) containing 200 ppm sulfite, using a hand operated french fry cutter with a ¼" blade. Slivers and non-uniform cuts were discarded during the cutting process.

French fry strips were blanched in 170° F. (77° C.) water in a steam heated jacketed kettle for 9 minutes and 30 seconds, then drained. Drained strips were placed in a single layer on a perforated drying tray and dried for 4 minutes, after which the strips were stirred, the trays rotated and drying continued for an additional 5 minutes.

For Samples B1 and B2, potatoes were cut into ¼" thick round potato slices using a Hobart rotary cutter. The cut slices were processed as noted above for french fry strips except that the blanch time was increased to 12 minutes.

Samples C1 and C2 were made by cutting the potatoes using a Ronco hand cutter with ripple assembly. The cutter thickness controller was set at 3.5 to obtain a cut thickness of approximately 0.38 inch. The lattice-cut effect was obtained by sliding the potato across the ripple cutting surface for the first cut, turning the potato 90 degrees for the second cut, then turning the potato 90 degrees for each subsequent cut. This method of cutting resulted in the direction of the ripples of the slice on one side being perpendicular to those on the opposite side. The lattice-cut slices were processed as above except that they were blanched for 20 minutes.

The blanched and dried potato samples were then divided into two parts, with half of each being further processed without the application of the aqueous slurry coating (A1, B1, and C1). The remaining half of each sample (A2, B2 and C2) were treated with the slurry coating as described below and further processed.

The aqueous slurry was prepared using ingredient percentages as listed in Table 1. The aqueous slurry consisted of 46.7% dry ingredients and 53.3% water. Dry ingredients were placed in a 5 quart mixing bowl using a KitchenAid mixer with paddle assembly. The mixer was turned on to speed 1 and water at 68° F. (20° C.) was added over 15 seconds. Fifty ml of the water were set aside for viscosity adjustments at the end of mixing. The aqueous slurry was mixed for 30 seconds. Speed was increased to setting 2 and the aqueous slurry was mixed for an additional 5 minutes. The aqueous slurry was allowed to set for 5 minutes. Stein Cup viscosity was measured 3 times to obtain the average result. Target Stein Cup results were 5.04–5.08 seconds. The Stein Cup viscosity is a measure of the time required for the aqueous slurry to pass from a plastic cup, 2¼" in diameter with a 2½" discharge height, through a bottom orifice of ⅝" diameter. This test measures thickness of the aqueous slurry where a longer discharge time indicates a thicker slurry. The viscosity was adjusted to meet the target by adding 10 ml increments of water as needed. Ten ml increments of water were mixed into the slurry after each batch of potatoes was coated to maintain the target viscosity throughout the coating operation.

TABLE 1

| Aqueous Slurry Formula for Samples A2, B2 and C2 | |
|---|---|
| INGREDIENT | GRAMS |
| White Corn Flour | 435.50 |
| Dextrin | 143.53 |
| Dent Corn Starch | 116.59 |
| Modified Starch | 96.85 |
| Rice Flour | 76.77 |
| Salt | 59.92 |
| SAPP | 4.93 |
| Water | 1,065.90 |

Application of aqueous slurry to the potato pieces was accomplished by placing 200 grams of the pieces into each aqueous slurry, stirring to coat the pieces, then dumping the coated pieces onto a wire rack set in a catch pan. Coated pieces were then arranged in a single layer on a second rack and excess slurry was blown off using an air knife. The slurry viscosity was adjusted after each batch as indicated above.

All samples were parfried in hydrogenated commercial frying oil for 45 seconds at 375° F. (191° C.) in a Frymaster Model H22 fryer.

The parfried pieces were frozen in a single layer on a perforated tray in a walk-in freezer at approximately –10° F. (–23° C.) with fans blowing on the product for at least 30 minutes. Product was packaged and stored in the freezer.

Frozen samples were prepared for evaluation by frying two-100 gram samples of the product using a divided frying basket. Samples were placed under heat lamps at the same time and were tested for flavor and crispness at 1, 15 and 20 minute intervals. A trained sensory panel used category scales to express intensity of crispness and flavor. The 5-point numerical scales were anchored on each end with verbal descriptors, such as "5=very crisp" and "1=not at all crisp". Samples A1 and A2 were presented together and compared as were Samples B1 and B2, and C1 and C2. Each was identified with a three digit code and evaluated in random order. The mean score of the panelists' judgements for each attribute was calculated and used to determine any significant differences between samples. Panelists evaluated each sample for each attribute as well as assigning a crispness ranking based on the most crisp sample being ranked number 1 and least crisp ranked number 2. Table 2 shows the results of the crispness and flavor evaluations described above.

Samples A2, B2 and C2 which were coated, were crisper when evaluated after a 1, 15 and 20 minute hold time and were ranked as the most crisp in each case when compared to Samples A1, B1 and C1. The flavor of Sample A2 was also more intense than Sample A1. The slurry matrix which is formed using the aforementioned ingredients and process forms a crisp exterior surface. The slurry matrix also serves to reduce surface browning due to high reducing sugar potatoes. The color was lighter and more consistent for Samples A2, B2 and C2 than Samples A1, B1 and C1. For example, sample A2 had a Munsell color of 1 while Sample A1 had a #2 color. It was also noted that the color was mottled on Sample A1 and not Sample A2. The fry color is determined by comparing the color of the finish fried pieces to a USDA Munsell color chart. A rating of "0000" indicates no browning during frying, while a rating of "4" indicates a dark, scorched appearance.

TABLE 2

| Sample Code | A1 | A2 | B1 | B2 | C1 | C2 |
|---|---|---|---|---|---|---|
| Sensory Evaluation | | | | | | |
| Cut Shape | Strip | Strip | Flat Slice | Flat Slice | Lattice | Lattice |
| Crispness @ 1 Min (5 = very crisp; 1 = not crisp) | 3.5 | 3.9 | 2.9 | 3.2 | 3.8 | 3.8 |
| Crispness @ 15 Min (5 = very crisp; 1 = not crisp) | 2.0 | 2.5 | 1.8 | 2.2 | 2.7 | 3.2 |
| Crispness @ 20 Min (5 = very crisp; 1 = not crisp) | 1.8 | 2.3 | 1.8 | 2.2 | 2.4 | 2.9 |
| RANKING RESULTS | | | | | | |
| Crispness Ranking @ 1 Min (1 = most; 2 = least) | 2 | 1 | 2 | 1 | 2 | 1 |
| Crispness Ranking @ 15 Min (1 = most; 2 = least) | 2 | 1 | 2 | 1 | 2 | 1 |
| Crispness Ranking @ 20 Min (1 = most; 2 = least) | 2 | 1 | 2 | 1 | 2 | 1 |

Example II

The aqueous starch slurry used as the basis of the present invention comprises three critical ingredients, namely, corn flour, raw starch and a low solubility dextrin. Starch slurries comprising varying levels of these ingredients and water (Sample B, C, D) were applied to ¼" french fries and compared to french fries without the slurry (Sample A) and french fries coated with the slurry containing additional ingredients (Sample E).

The french fry strips were cut, blanched and dried and the various starch slurry formulations were applied as described in Example I. The dry formulas for slurries A, B, C, D and E are found in Table 3. The samples were subsequently parfried and frozen as described in Example I.

TABLE 3

| Starch Slurry Formula - Dry Basis | | | | | |
|---|---|---|---|---|---|
| | A | B | C | D | E |
| White Corn Flour (%) | 0 | 59.0 | 67.5 | 79.50 | 46.45 |
| Amaizo 1110 Dextrin (%) | 0 | 24.0 | 24.0 | 12.0 | 15.98 |
| Dent Corn Starch (%) | 0 | 17.0 | 8.5 | 8.5 | 12.0 |
| Modified Starch (%) | 0 | 0 | 0 | 0 | 9.99 |
| Rice Flour (%) | 0 | 0 | 0 | 0 | 8.0 |
| Salt (%) | 0 | 0 | 0 | 0 | 7.0 |
| SAPP (%) | 0 | 0 | 0 | 0 | 0.576 |

Frozen samples were prepared for evaluation by frying 100 gram samples of each product simultaneously in a divided basket. The flied samples were placed under heat lamps and evaluated after 1, 15 and 20 minutes as described in Example I.

Results of this evaluation are found in Table 4.

TABLE 4

| Sample Code | A | B | C | D | E |
|---|---|---|---|---|---|
| Sensory Evaluation | | | | | |
| Crispness @ 1 Min (5 = very crisp; 1 = not at all) | 3.5 | 3.5 | 3.7 | 3.8 | 3.9 |
| Crispness @ 15 Min (5 = very crisp; 1 = not at all) | 2.0 | 2.5 | 2.6 | 2.7 | 2.5 |
| Crispness @ 20 Min (5 = very crisp; 1 = not at all) | 1.8 | 2.6 | 2.3 | 2.2 | 2.3 |
| CRISPNESS RANKING RESULTS | | | | | |
| Crispness Ranking @ 1 Min (1 = most; 5 = least) | 4.5 | 4.5 | 3 | 2 | 1 |
| Crispness Ranking @ 15 Min (1 = most; 5 = least) | 5 | 3.5 | 2 | 1 | 3.5 |
| Crispness Ranking @ 20 Min (1 = most; 5 = least) | 5 | 1 | 2.5 | 4 | 2.5 |

Sensory results clearly show that at all test intervals, the starch slurry comprising corn flour, corn starch and low solubility dextrin increased the crispness of the french fries (B-E) when compared to a non-coated sample (A). Additionally, the hold time of french fries (B-E) was significantly longer than non-coated sample (A). That is, coated samples (B-E) remained more crisp than non-coated sample (A) as the test proceeded. Alternatively, Sample E shows that the addition of ingredients such as SAPP and Batter Bind S (a modified starch) does not significantly improve the product's hold time.

Example III

Effect of salt level on crispness was evaluated by adding varied levels of salt to the standard aqueous slurry formula. The salt levels in the slurries were: A-0%, B-5%, C1 and C2-7%, D-9% and E-11%. The aqueous slurry was applied to ¼" cut french fry strips which were processed, frozen, fried and then evaluated under heat lamps over an extended period of time.

French fry strips were cut, blanched and dried, and slurries mixed and applied as described in Example I. Dry formulas for slurries A, B, C, D and E are found in Table 5.

TABLE 5

| Slurry Formulas - Dry Basis | | | | | |
| --- | --- | --- | --- | --- | --- |
| | A | B | C | D | E |
| White Corn Flour % | 53.45 | 48.45 | 46.45 | 44.46 | 42.46 |
| Dextrin % | 15.98 | 15.98 | 15.98 | 15.98 | 15.98 |
| Dent Corn Starch % | 12.0 | 12.0 | 12.0 | 12.0 | 12.0 |
| Modified Starch % | 9.99 | 9.99 | 9.99 | 9.99 | 9.99 |
| Rice Flour % | 8.0 | 8.0 | 8.0 | 8.0 | 8.0 |
| Salt % | 0 | 5 | 7 | 9 | 11 |
| SAPP % | 0.576 | 0.576 | 0.576 | 0.576 | 0.576 |

Sensory evaluations for crispness and flavor were conducted as previously described in Example I. The samples were evaluated in two groupings with A, B and C1 in Test 1 and C2, D and E in Test 2. Table 6 shows the results of the crispness and flavor evaluations.

TABLE 6

| | TEST 1 | | | TEST 2 | | |
| --- | --- | --- | --- | --- | --- | --- |
| Sample Code | A | B | C1 | C2 | D | E |
| Sensory Evaluation | | | | | | |
| Crispness @ 1 Min (5 = very crisp; 1 = not at all) | 3.6 | 3.8 | 3.8 | 3.6 | 4.0 | 4.0 |
| Crispness @ 15 Min (5 = very; 1 = not) | 2.4 | 2.6 | 3.0 | 2.8 | 2.9 | 2.8 |
| Crispness @ 20 Min (5 = very; 1 = not) | 2.1 | 2.2 | 2.3 | 2.4 | 2.7 | 2.7 |
| Flavor Intensity (5 = strong flavor; 1 = no flavor) | 2.3 | 2.4 | 2.4 | 2.5 | 2.7 | 2.6 |
| CRISPNESS RANKING RESULTS | | | | | | |
| Crispness Ranking @ 1 Min (1 = most; 3 = least) | 3 | 1 | 2 | 3 | 1.5 | 1.5 |
| Crispness Ranking @ 15 Min (1 = most; 3 = least) | 3 | 2 | 1 | 2.5 | 1 | 2.5 |
| Crispness Ranking @ 20 Min (1 = most; 3 = least) | 3 | 2 | 1 | 3 | 2 | 1 |

Sample A (0% salt) was the least crisp of the first series with a slightly tough and leathery texture. This sample also had the least salty flavor. Sample B (5% salt) was the most crisp initially but became slightly chewy and leathery by the 15 minute evaluation. Product C1 (7% salt) retained crispness the best after being held for evaluation at 15 and 20 minutes with an initial crispness rating equal to B. It did develop a slightly leathery texture by 20 minutes. Sample C2 (7% salt) was less crisp than E or D on all tests. Samples D (9% salt) and E (11% salt) were noticeably crisper than C2, but were similar to each other, with E being ranked slightly most crisp at 20 minutes. These results indicate that the salt level significantly affects the crispness of the slurry coating over time when held under a heat lamp.

Example IV

A test was conducted where ¼" fries were coated with aqueous starch-based slurries which had the following variables: A- standard formula with Amaizo 1110 Dextrin; B- No dextrin; C- Sta Dex 15 Dextrin; D- Sta Dex 9 Dextrin; E- Tapioca Dextrin. The Amaizo 1110, Sta Dex 9 and Sta Dex 15 are low solubility dextrins, being generally less than 20% soluble. The Tapioca Dextrin is a highly soluble dextrin. Solubilities for each dextrin, obtained from the manufacturer's literature, are listed in Table 7.

TABLE 7

| Dextrin Solubility | | |
| --- | --- | --- |
| Sample | Dextrin Tested | Solubility (%) |
| A | Amaizo 1110 | 12% |
| C | Sta Dex 15 | 5–15% |
| D | Sta Dex 9 | 14–23% |
| E | Tapioca Dextrin | >90% |

French fries were prepared as described in Example I using the dextrins listed in Table 7 in the slurry formulations. Sample B had no dextrin added to the aqueous slurry and the percentage of white corn flour and rice flour were increased accordingly.

Sensory results showed that dextrin is needed in the aqueous slurry for the product to retain its crispness. Sample B, without dextrin in the slurry, became soggy and limp after a 15 minute hold time, while the control retained its crispness. Testing of the dextrins showed that the lower the solubility, the better the retention of crispness. In contrast, the highly soluble tapioca dextrin sample (E) had lost its crispness after 15 minutes of hold time. Sample E also browned to an unacceptable level during frying.

Example V

Two samples of ¼" french fries were made and coated with aqueous slurry. The french fries were prepared as described in Example I. Sample A was coated with the standard aqueous slurry formula while B had the rice flour removed and the percentages of remaining ingredients were increased proportionately to make up the difference. Table 8 shows the dry slurry formulas.

TABLE 8

| Slurry Formula - Dry Basis | | |
| --- | --- | --- |
| Ingredient | A | B |
| White Corn Flour (%) | 46.45 | 50.5 |
| Dextrin (%) | 15.98 | 17.3 |
| Dent Corn Starch (%) | 12.0 | 13.0 |
| Modified Starch (%) | 9.99 | 10.9 |
| Rice Flour (%) | 8.0 | 0 |
| Salt (%) | 7.0 | 7.6 |
| SAPP (%) | 0.576 | 0.626 |

Fried samples of each were evaluated at 1, 15 and 20 minutes. Results of the sensory evaluations showed that the rice flour enhances the initial crispness of the slurry-coated french fry. Rice flour also enables the french fry to retain its structure and shape when held under the heat lamp, thus preventing a shriveled appearance.

While the present invention has been described by reference to specific embodiments, it will be apparent that other alternative embodiments and methods of implementation or modification may be employed without departing from the true spirit and scope of the invention.

What is claimed is:

1. A process for preparing a potato product having an extended hold time, the process comprising:

(a) washing, cutting, and blanching raw potatoes;

(b) partially drying surfaces of the blanched potatoes;

(c) coating the partially dried potatoes with an aqueous starch-based slurry, the aqueous slurry including corn flour, corn starch, low solubility dextrin, and water; and then (d) parfrying the coated potatoes.

2. The process of claim 1 wherein the potato product is, selectively, french fry strips, wedges, spirals, slices, lattice-cut slices, or cubes.

3. The process of claim 1 wherein the aqueous slurry further includes rice flour.

4. The process of claim 1 wherein the aqueous slurry further includes sodium chloride.

5. The process of claim 1 wherein the aqueous slurry further includes seasoning and flavoring ingredients.

6. The process of claim 1 wherein the aqueous slurry contains about 40% to 50% solids.

7. The process of claim 1 wherein the potatoes are preheated after the washing and prior to the cutting of step (a).

8. The process of claim 1 wherein the potatoes are soaked in a water slurry containing sodium acid pyrophosphate and a reducing sugar prior to the drying of step (b).

9. The process of claim 1 wherein the potatoes are frozen and packaged after the parfrying of step (d).

10. The process of claim 1 wherein the potatoes are, selectively, finish fried, microwaved, or baked after the parfrying of step (d).

* * * * *

UNITED STATES PATENT AND TRADEMARK OFFICE
CERTIFICATE OF CORRECTION

PATENT NO.   : 5,622,741
DATED        : April 22, 1997
INVENTOR(S)  : Clifford A. Stubbs, John F. Stevens It is certified that error appears in the above-indentified patent and that said Letters Patent is hereby corrected as shown below:

On the cover sheet, top left corner, delete "Stubbs et al" and insert therefore "Stevens et al."

On the cover sheet, [75] after Inventors, delete "Clifford A. Stubbs, Iona; John F. Stevens, Idaho Falls," and insert "John F. Stevens, Idaho Falls; Clifford A. Stubbs, Iona."

Signed and Sealed this

Fifth Day of August, 1997

Attest:

BRUCE LEHMAN

*Attesting Officer*   *Commissioner of Patents and Trademarks*